US008811914B2

(12) United States Patent
Britz et al.

(10) Patent No.: US 8,811,914 B2
(45) Date of Patent: Aug. 19, 2014

(54) METHOD AND APPARATUS FOR DYNAMICALLY PROCESSING AN ELECTROMAGNETIC BEAM

(75) Inventors: David Michael Britz, Rumson, NJ (US); Robert Raymond Miller, II, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 30 days.

(21) Appl. No.: 12/858,733

(22) Filed: Aug. 18, 2010

(65) Prior Publication Data

US 2011/0098033 A1 Apr. 28, 2011

Related U.S. Application Data

(60) Provisional application No. 61/254,102, filed on Oct. 22, 2009.

(51) Int. Cl.

| | |
|---|---|
| ***H04B 17/00*** | (2006.01) |
| ***H04B 1/00*** | (2006.01) |
| ***H04B 15/00*** | (2006.01) |
| ***H04B 1/04*** | (2006.01) |
| ***H04B 1/16*** | (2006.01) |
| ***H04B 1/06*** | (2006.01) |
| ***H04B 7/00*** | (2006.01) |
| ***H04B 1/10*** | (2006.01) |
| ***H04M 1/00*** | (2006.01) |
| ***H04B 1/02*** | (2006.01) |
| ***H01Q 3/44*** | (2006.01) |
| ***H01Q 15/00*** | (2006.01) |

(52) U.S. Cl.

CPC ............. *H01Q 3/44* (2013.01); *H01Q 15/0026* (2013.01); *H01Q 15/0086* (2013.01); *H01Q 15/002* (2013.01)

USPC .................... 455/67.16; 455/63.4; 455/114.3; 455/562.1; 455/42; 455/205; 455/276.1; 455/304; 455/106; 455/107; 367/138

(58) Field of Classification Search

USPC ........................................................ 455/63.4

See application file for complete search history.

(56) References Cited

U.S. PATENT DOCUMENTS

| | | | |
|---|---|---|---|
| 5,359,669 | A | 10/1994 | Shanley et al. |
| 7,197,248 | B1 | 3/2007 | Vorontsov et al. |

(Continued)

FOREIGN PATENT DOCUMENTS

| | | | |
|---|---|---|---|
| EP | 1596 470 | A1 | 11/2005 |
| EP | 1 816 491 | A1 | 8/2007 |

(Continued)

OTHER PUBLICATIONS

International Search Report and Written Opinion for PCT/US2010/053320, Jan. 27, 2011, copy consists of 12 unnumbered pages.

(Continued)

*Primary Examiner* — Temesgh Ghebretinsae
*Assistant Examiner* — Devan Sandiford

(57) ABSTRACT

A method and apparatus for processing a terahertz frequency electromagnetic beam are disclosed. For example, the method receives the terahertz frequency electromagnetic beam via a metamaterial having a plurality of addressable magnetic elements, where a resonant frequency of each of the plurality of addressable magnetic elements is capable of being programmably changed via an adjustment, and activates selectively a subset of the plurality of addressable magnetic elements to manipulate the terahertz frequency electromagnetic beam.

17 Claims, 8 Drawing Sheets

(56) References Cited

U.S. PATENT DOCUMENTS

| | | | | |
|---|---|---|---|---|
| 7,221,931 | B2 | 5/2007 | Benco et al. | |
| 7,525,711 | B1 * | 4/2009 | Rule et al. | 359/244 |
| 7,768,380 | B2 | 8/2010 | Breed et al. | |
| 7,864,394 | B1 * | 1/2011 | Rule et al. | 359/244 |
| 8,126,467 | B2 | 2/2012 | Choi et al. | |
| 8,213,022 | B1 | 7/2012 | Riza et al. | |
| 8,233,673 | B2 | 7/2012 | Britz et al. | |
| 8,369,584 | B2 | 2/2013 | Britz et al. | |
| 8,417,121 | B2 | 4/2013 | Britz et al. | |
| 8,451,189 | B1 * | 5/2013 | Fluhler | 343/909 |
| 8,515,294 | B2 | 8/2013 | Britz et al. | |
| 2005/0200540 | A1 * | 9/2005 | Isaacs et al. | 343/754 |
| 2006/0109540 | A1 * | 5/2006 | Kueks et al. | 359/321 |
| 2006/0114170 | A1 | 6/2006 | Sievenpiper | |
| 2007/0146535 | A1 | 6/2007 | Nanjo | |
| 2008/0013071 | A1 | 1/2008 | Tsumura et al. | |
| 2008/0130413 | A1 * | 6/2008 | Bachelor et al. | 367/103 |
| 2008/0147409 | A1 | 6/2008 | Taormina | |
| 2008/0165079 | A1 * | 7/2008 | Smith et al. | 343/911 R |
| 2008/0173801 | A1 * | 7/2008 | Uduki | 250/230 |
| 2008/0245872 | A1 | 10/2008 | Good | |
| 2008/0285032 | A1 | 11/2008 | Ohkubo | |
| 2009/0088203 | A1 | 4/2009 | Havens et al. | |
| 2009/0163175 | A1 | 6/2009 | Shi et al. | |
| 2009/0251618 | A1 * | 10/2009 | Gao et al. | 348/731 |
| 2009/0295483 | A1 * | 12/2009 | Alidio et al. | 330/277 |
| 2010/0053763 | A1 * | 3/2010 | Chowdhury et al. | 359/652 |
| 2010/0067918 | A1 | 3/2010 | Federici et al. | |
| 2010/0086750 | A1 * | 4/2010 | Blumberg et al. | 428/195.1 |
| 2010/0102233 | A1 | 4/2010 | Gelmond | |
| 2010/0165431 | A1 * | 7/2010 | Li et al. | 359/32 |
| 2010/0166430 | A1 | 7/2010 | Alten | |
| 2011/0008062 | A1 | 1/2011 | Ashdown | |
| 2011/0133087 | A1 | 6/2011 | Mann et al. | |
| 2011/0293268 | A1 | 12/2011 | Britz et al. | |
| 2012/0099856 | A1 | 4/2012 | Britz et al. | |
| 2013/0089242 | A1 | 4/2013 | Britz et al. | |
| 2013/0223839 | A1 | 8/2013 | Britz et al. | |

FOREIGN PATENT DOCUMENTS

| | | | |
|---|---|---|---|
| EP | 2 076 071 | A1 | 1/2009 |
| JP | H11-96252 | | 4/1999 |
| JP | 2003-067346 | | 7/2003 |
| JP | 2007-333975 | | 12/2007 |
| WO | WO 00/31679 | | 6/2000 |
| WO | WO 2006/023195 | A2 | 3/2006 |
| WO | WO 2006/055798 | A1 | 5/2006 |
| WO | WO 2007/088453 | A1 | 9/2007 |
| WO | WO 2008/121159 | A2 | 10/2008 |

OTHER PUBLICATIONS

S. Kuiper et al., “Variable-focus liquid lens for miniature cameras,” Applied Physics Letters, AIP, American Institute of Physics, vol. 85, No. 7, Jan. 1, 2004, pp. 1128-1130.

International Search Report and Written Opinion for PCT/US2010/053311, Jan. 13, 2011, copy consists of 12 unnumbered pages.

EP Examination Report for European Patent Application No. 10 778 760.8-1812, dated Aug. 29, 2013, pp. 1-4.

* cited by examiner

METHOD AND APPARATUS FOR DYNAMICALLY PROCESSING AN ELECTROMAGNETIC BEAM

CROSS REFERENCE TO RELATED APPLICATIONS

This application claims priority under 35 U.S.C. §119 (e) to provisional application Ser. No. 61/254,102 filed Oct. 22, 2009, the disclosure of which is hereby incorporated by reference in its entirety.

FIELD OF DISCLOSURE

The present disclosure relates generally to steered antennas and, more particularly, to a method for processing a terahertz frequency electromagnetic beam.

BACKGROUND

The increasing utilization of mobile personal devices, e.g., cell phones, smart phones, etc., has dramatically increased network traffic. For example, fully one billion people worldwide are Internet users with a large portion of this population accessing the Web through their mobile phones. In addition, the behavior of mobile phone customers has changed in recent years. The number of users accessing media-rich data and social networking sites via mobile personal devices has risen dramatically. For example, the average owner of a smart phone today transacts many times the amount of data than did early smart phone users. Consequently, there is a need to continually grow the network capacity to accommodate the ever increasing traffic.

But as is often the case, with great success also comes great challenges. For example, some cellular service providers are struggling to keep up with demand and they may have to place limits on data usage to conserve network bandwidth and spectrum during periods of extremely high usage. This industry pushback is clearly a reaction to the recognition of the bandwidth and capacity limits of existing cellular systems. However, placing limits on data usage is an unpractical approach to reduce demand, which also reduces revenue for the service provider and creates dissatisfaction for customers.

SUMMARY

In one embodiment, the present disclosure teaches a method and apparatus for processing a terahertz frequency electromagnetic beam. For example, the method receives the terahertz frequency electromagnetic beam via a metamaterial having a plurality of addressable magnetic elements, where a resonant frequency of each of the plurality of addressable magnetic elements is capable of being programmably changed via an adjustment, and activates selectively a subset of the plurality of addressable magnetic elements to manipulate the terahertz frequency electromagnetic beam.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
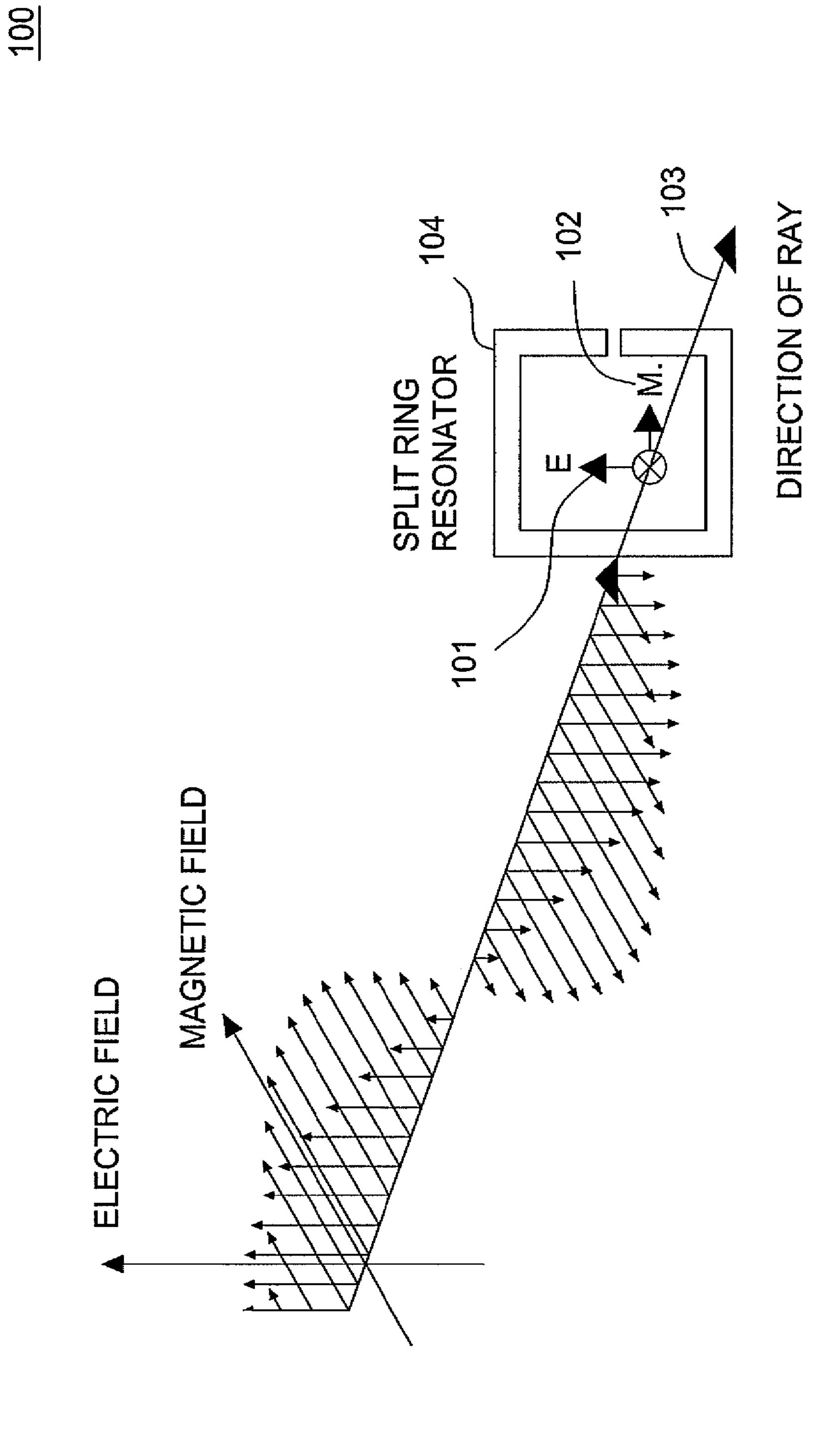
FIG. 1 illustrates an example of the directionality of E/M (electromagnetic) waves passing through an Split-Ring Resonator (SRR)

In one embodiment, the present disclosure broadly teaches a method and apparatus for steering a terahertz frequency electromagnetic beam. For example, the present method and apparatus can be applied to various wireless access networks that would benefit from dynamic control of electromagnetic beams. A wireless access network may support a wireless service, e.g., Wi-Fi (Wireless Fidelity), WiMAX (Worldwide Interoperability for Microwave Access), 2G, 3G, or LTE (Long Term Evolution) or other 4G wireless services, and the like. Broadly defined, Wi-Fi is a wireless local area network (WLAN) technology based on the Institute of Electrical & Electronics Engineers (IEEE) 802.11 standards. WiMAX is a wireless metropolitan area network (MAN) technology based on the Institute of Electrical & Electronics Engineers (IEEE) 802.16 standards. 2G is a second generation cellular network technology, 3G is a third generation cellular network technology, and 4G is a fourth generation cellular network technology. Global System for Mobile (GSM) communications is an example of a 2G cellular technology, Universal Mobile Telecommunications System (UMTS) is an example of a 3G cellular network technology, and an LTE is an example of a 4G cellular network technology. It should be noted that the present disclosure is not limited to a particular type of wireless service.

The increasing utilization of portable personal devices has dramatically increased wireless network traffic. In one embodiment, the current method enables expansion of the capacity of the wireless network using a wireless transport architecture that utilizes frequencies in the terahertz (THz) spectrum for a coverage area that is referred to as a nanocell. A nanocell might be conceived as a next generation gradation of microcells serving as a basis for a Neighborhood Area Network (NAN). As discussed further below, the use of the nanocell can be used in conjunction with other wireless access technology, e.g., a cellular network, a Wi-Fi network, and the like.

One consideration for using THz frequencies is related to the sizes of THz antennas. Devices that operate in the THz spectrum by definition use a Terahertz frequency. The wavelength of a waveform whose frequency is in the order of a THz is very small. As the wavelength becomes smaller, the antenna's aperture, (i.e., the area over which the antenna collects or launches an electromagnetic wave), is correspondingly reduced. Conventional microwave cellular radios have antennas that are on the order of inches in length. But as wavelengths get smaller, and especially in the higher frequency domains of millimeter and near-THz frequencies, antennas can shrink to literally microscopic proportions. The proportion of radio energy intercepted and collected by so small an antenna is quite small, dramatically reducing the reach of nano-cellular links.

Some approaches to overcoming the link budget are: using better signal processing and/or coded-modulation methods for closer Shannon approach; transmitting fewer bits per second while increasing the energy/symbol and "spreading"; increasing the transmit power until an acceptable link margin is obtained; and collecting more of the transmitted power by using a larger collector (i.e., in other words increasing the antenna gain and aperture. However, signal processing and advanced coding have already come within a few dB of Shannon. Furthermore, since the vision for the application is extreme throughput, reducing the transmission rate is counter-productive. Finally, increasing transmitted power is itself a law of diminishing returns, particularly at THz frequencies due to device limitations and battery constraints.

However, antenna gain grows by the square of the collecting aperture (in the case of a dish collector). An antenna that provides an efficient, low-noise means to increase received signal must then be large. Unfortunately, increasing the antenna size-to-wavelength ratio (aperture enhancement) also increases the directivity of the transmission beam and decreases its areal coverage. At the receiver, the antenna "sees" a smaller field of view through which to receive the intended transmission, which can complicate link alignment. For example, omni-directional antennas may be designed to function effectively by limiting their size to a fraction of a wavelength. As an illustration, an omni-directional quarter wave 300 GHz antenna would measure only 250 microns (1/100 of an inch), in length. However, the highly directional nature of these antennas creates a challenge in maintaining beam alignment between the transmitter and receiver antennas. For portable devices, the devices are by definition changing their position. Hence, beam alignment becomes even more challenging and necessary.

In one embodiment, the current method overcomes the complications of the beam alignment by implementing a method for active beam steering and tracking at both ends of the THz link. For example, antennas may be used at both ends of the THz link to provide both high throughput and acceptable transmission distances in nano-cells.

In one embodiment, the current method overcomes the limitations of the beam alignment by implementing metamaterials at both ends of the THz link to manipulate or align (e.g., to shape, to steer, to focus, and the like) the THz electromagnetic waves. That is, the current method teaches using metamaterials, described below, as an active means of beam alignment (e.g., steering and tracking). It should be noted that the term "beam alignment" should be broadly interpreted as manipulating the beam to achieve any number of properties, e.g., steering (broadly changing a path of the beam), shaping (broadly changing a shape of the beam), focusing (broadly changing a focus of the beam), delaying (broadly changing a timing of the beam), phase shifting (broadly changing a phase of the beam), frequency filtering (broadly changing a frequency of the beam), and the like.

Metamaterial refers to a manmade material that is engineered to have properties that do not occur naturally. For example, a metamaterial can be engineered to have a negative index of refraction as one of its properties. Metamaterials use a periodic structure to influence the phase of a passing electromagnetic wave via electrical or magnetic influences. In order to achieve a desired property, metamaterials are engineered with periodic structures that most often are recognized as comprising a matrix of modified microscopic addressable magnetic elements, e.g., ring resonators called Split Ring Resonators (SRRs), described below. It is possible that other microscopic shaped electrically controllable periodic structures are capable of affecting the magnetic part of the E/M wave and may be utilized in this beam forming purpose as alternatives to SRR devices.

Other metamaterial configurations can be encompassed in this embodiment and would include metamaterials used in combination with refractive elements such as lenses or in a reflective mode where the metamaterial itself acts as a mirror or a passive reflective surface is placed behind a single or multi-layered stack of transmissive metamaterials so as to return the transmitted wave through a second cycle of influence of the metamaterials magnetic fields, thereby increasing the metamaterials wave bending properties and the total wave shaping of the hybrid lens metamaterial configuration. The above described reflective surface itself may, like a refractive lens, have a plane, concave or convex surface figure to aid focusing the wave but use the metamaterial layer to actively and dynamically influence the transiting waves behavior in desirable ways such as precision focus, position and phase control. An optical analogue example of this refractive/reflective hybrid would be the mengius lens, a hybrid refracting meniscus lens utilizing a rear surface mirror designed to return the wave through the refractive element a second time. In this way a metamaterial "lens" may use discrete transmissive and reflective components and combinations thereof with in path metamaterial layers to produce the desired beam forming, phase and directing properties.

In one embodiment, an addressable magnetic element, e.g., a Split Ring Resonator (SRR) refers to a structure composed of non-magnetic conductive material that exhibits a bipolar field pattern when excited by an externally-applied E/M field. Such devices can be made to operate at Terahertz frequencies. Much interest has recently focused on the use of the split ring resonator to explore creation of negative permeability and permittivity connected with optical and radio wave cloaking. This disclosure instead addresses use of such structures for shaping of electromagnetic fields in a manner similar to optical and dielectric lenses.

For example, an SRR may be made of copper. In one embodiment, the structure of the SRR comprises a circular conductor with an opening in it (the split). SRRs may also be realized as two arcs, one nested within the other. The size of the ring structure and the spacing between the ring arcs (as well as the split in the rings) are designed to exhibit capacitance that can lower the resonant frequency of the ring(s), and allow the rings to respond to wavelengths larger than the rings themselves. In one embodiment, the structure of the split ring comprises rings of a shape selected for inducing different properties from one or more of shapes: an arc, a square, a fan, and so on. The structure is similar to a loop antenna whose loop has been made to resonate by use of a series capacitance. Such antennas can be used to provide effective coupling to propagating E/M waves while remaining small with respect to the wavelength of interest. Because the antenna is usually a fraction of the wavelength of interest, the antenna displays a high "Q", indicating that the frequency range over which the antenna is resonant with a passing E/M wave is quite narrow.

In one embodiment, the presence of a passing electromagnetic field produces rotating currents in the ring's arcs which, in turn, produces a magnetic flux surrounding the ring arcs that affects the passing electromagnetic (E/M) field causing its propagation to be altered. The magnetic permeability of the rings (i.e., degree of magnetization) can vary in relation to the size of the ring structure and the frequency (or wavelength) of the incident wave, and magnetic field of the passing wave. Thus, longer wavelengths (lower frequency) produce a large positive permeability, whereas shorter wavelengths (higher frequency) produce a negative permeability. Negative permeability combined with a negative dielectric constant of the substrate produce the negative refractive index effect. Thus, by adjustment of the ring's resonance, one may "redirect" the propagation of the impinging wave in a manner similar to the action of "director" and "reflector" elements on a directional electric-field antenna.

In one embodiment, a modification of the ring's resonant frequency with relation to a passing E/M field can be produced by varying the resonant frequency of the resonating structure. This may be accomplished, for example, by applying an externally-applied voltage to a voltage-variable capacitor interposed between the split-ring's arcs. Such functionality is frequently realized by use of a diode semiconducting device called a varactor whose apparent "depletion region" thickness may be increased with application of reverse voltage bias producing an inverse relationship between applied bias and capacitance. Such devices exhibit a continuous, albeit nonlinear, capacitance change with respect to applied voltage change within a range of possible capacitance values. Bipolar and unipolar (FET) transistors can also be used to realize continuous voltage variable capacitance behaviors. In one embodiment, each programmably-applied voltage of each varactor is stored by a capacitor connected to an FET or bipolar switch responsive to multiplexing signals provided for the purposes of addressing the capacitor.

It should be noted that certain barium-strontium-titanate ceramics also exhibit varactor properties. Information on the fabrication and operation of such bulk devices is available in the literature and will not be covered here. It should be noted however that recently techniques have also entered the literature disclosing organic and inorganic semiconductor fabrication techniques that could allow transistors to be co-fabricated on the same substrate as the split ring resonator structure.

Figure 8:
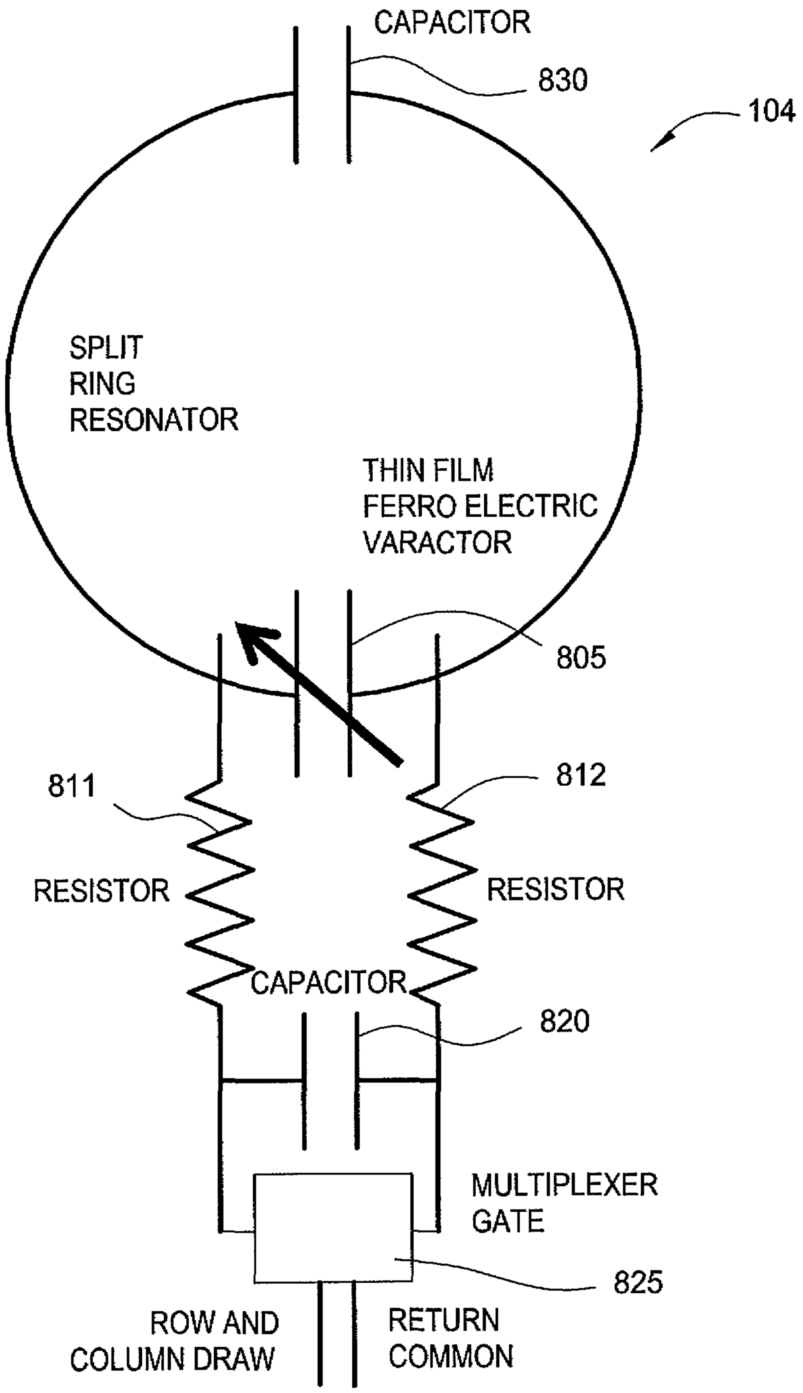
FIG. 8 illustrates an illustrative implementation of a split ring resonator.

FIG. 8 illustrates an illustrative implementation of a split ring resonator 104. However, it should be noted that FIG. 8 is only illustrative. As such, a split ring resonator can be implemented in other configurations without departing from the scope of the present disclosure. The split ring resonator comprises a varactor 805, two resistors 811 and 812, a fixed capacitor 820 and a multiplexer gate 825.

In general, the application of a voltage across the varactor (or varactor device) requires that the varactor be isolated from the SRR's conductive metal pattern via a fixed capacitance 830 in series with the varactor, causing the series combination of varactor and capacitor to be interposed across the split in the ring. For SRRs that may have more than one "split", the isolating capacitance of the $2^{nd}$ split may provide the needed DC isolation. Voltage can be applied across the varactor through two high-value resistors 811 and 812 which serve to isolate the programming circuit from the resonator structure without materially decreasing its "Q". In other words, each varactor's bias is applied through two resistors connected to the capacitor for isolating a DC bias from the RF currents circulating in each addressable split-ring resonator. The resistors feed the bias voltage from a second fixed capacitor 820 which maintains it between multiplexing cycles. This second storage capacitor may have capacitance much larger than the varactor or DC isolation capacitances. This multiplexing/storage process is similar to that used currently to implement TFT displays. In one embodiment, each varactor exhibits a capacitance proportional to a programmably-applied voltage.

Using the embodiment described above, the tunable split-ring resonator may create a variable-frequency resonance whose reflection coefficient "steers" the passing E/M field as desired. Thus, the ring's apparent varying permeability provides control of a localized magnetic influence on the passing wave. By appropriately "tuning" a two-dimensional array of split-rings, the propagation of an E/M "wavefront" traversing the array can be programmably changed.

In order to realize a programmable array of split-ring resonators employing materials to achieve voltage-variable capacitance, it is necessary to address each resonator's varactor and to store a voltage (charge) corresponding to the desired capacitance. To see how this may be done, one may view the similarity between a planar 2D metamateral array of split-ring resonators and a thin-film transistor (TFT) visual display. Such a display contains "pixels" of charge-responsive liquid crystal cells with companion thin film transistors that instantiate an analog memory for each pixel (employing a fixed storage capacitance), addressed by row and column in a multiplexing arrangement that "gates" charge into the memory.

Arrays of 2D programmable split ring resonators may thus be viewed simply as extensions of TFT visual displays, spatial light modulators, or at microscopic scale, photonic crystals.

Leveraging the similarities, tunable metamaterials can be fabricated as circuits on substrates utilizing "printable" conducting and semiconducting materials in a process similar to commercial printing.

In one embodiment, the current disclosure teaches a 2D array metamaterial that comprises split ring resonators that are independently addressed and programmed. For example, each of the split ring resonators is independently and electrically addressable from other nearby split ring resonators, such that a discrete resonant "spot" or "element" that is capable of magnetically deflecting a passing E/M wave is created. The selective programming of the elements may then allow a discrete pattern or group of split ring resonators to be utilized to form a composite areal reflection function of arbitrary shape.

For example, a particular shape can be designed and spatially configured to manipulate a passing wave both statically and dynamically, subject to the speed with which the individual resonators can be programmed. One of the advantages of the current teaching is that the method provides an ability to steer an E/M wave of millimeter or terahertz wavelength to a desired location. The SRR can be tuned via fabrication geometry for the frequency band of interest to achieve a particular shape, which can subsequently be varied by programming. For example, in one embodiment one may simulate the behavior of a holographic grating.

In the embodiment, the current method and apparatus teach dynamically modifying the phase and direction of passing electromagnetic waves using metamaterials that comprise independently addressable split-ring resonators to produce controlled beam steering, focusing and/or shaping.

FIG. 1 illustrates an exemplary illustration 100 on the directionality of E/M waves passing through a magnetic element, e.g., an SRR. The electric field components 101 and magnetic field components 102 oscillate perpendicular to each other and perpendicular to the direction of the ray 103. The oscillating E/M waves are illustrated passing through an SRR 104.

Figure 2:
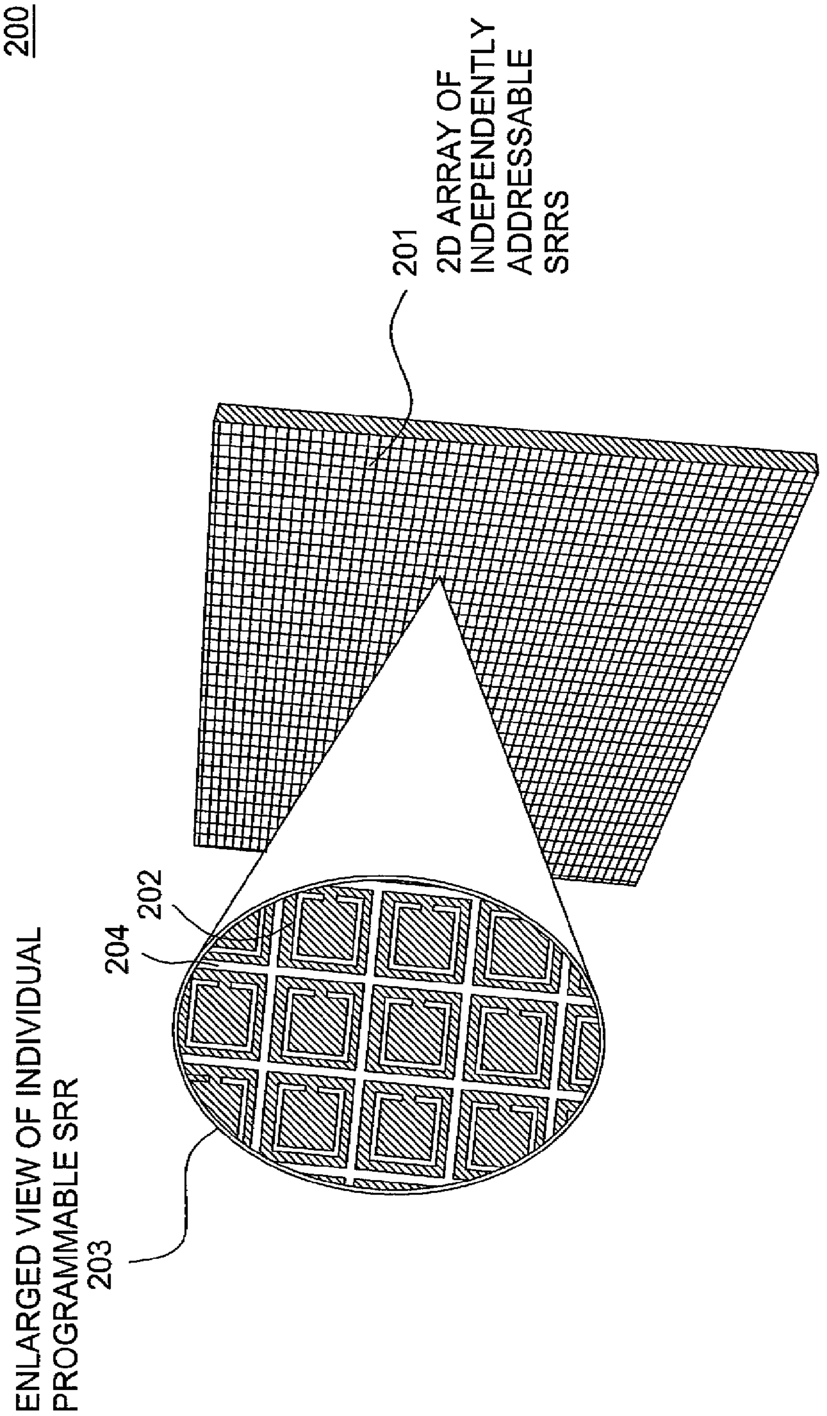
FIG. 2 illustrates a layer of a 2D (two-dimensional) metamaterial film.

FIG. 2 illustrates an illustrative layer 200 of a 2D metamaterial film. The layer 200 of a metamaterial film comprises a two dimensional array 201 of independently addressable split ring resonators 202. An enlarged view 203 of individually addressable (programmable) SRRs comprises a plurality of the SRRs 202 and the means (e.g., individual sets of addressable terminals for receiving an electrical charge, broadly shown as grid lines only) for charging each SRR 204. In other words, the grid lines are intended to show that each SRR can be selectively addressed and activated. Thus, a portion of the SRRs 202 on the array can be magnetically activated while another portion is inactive. For example, a software program operated by a controller (broadly a processor) in communication with a current source is used to create a desired pattern as discussed below.

Figure 3:
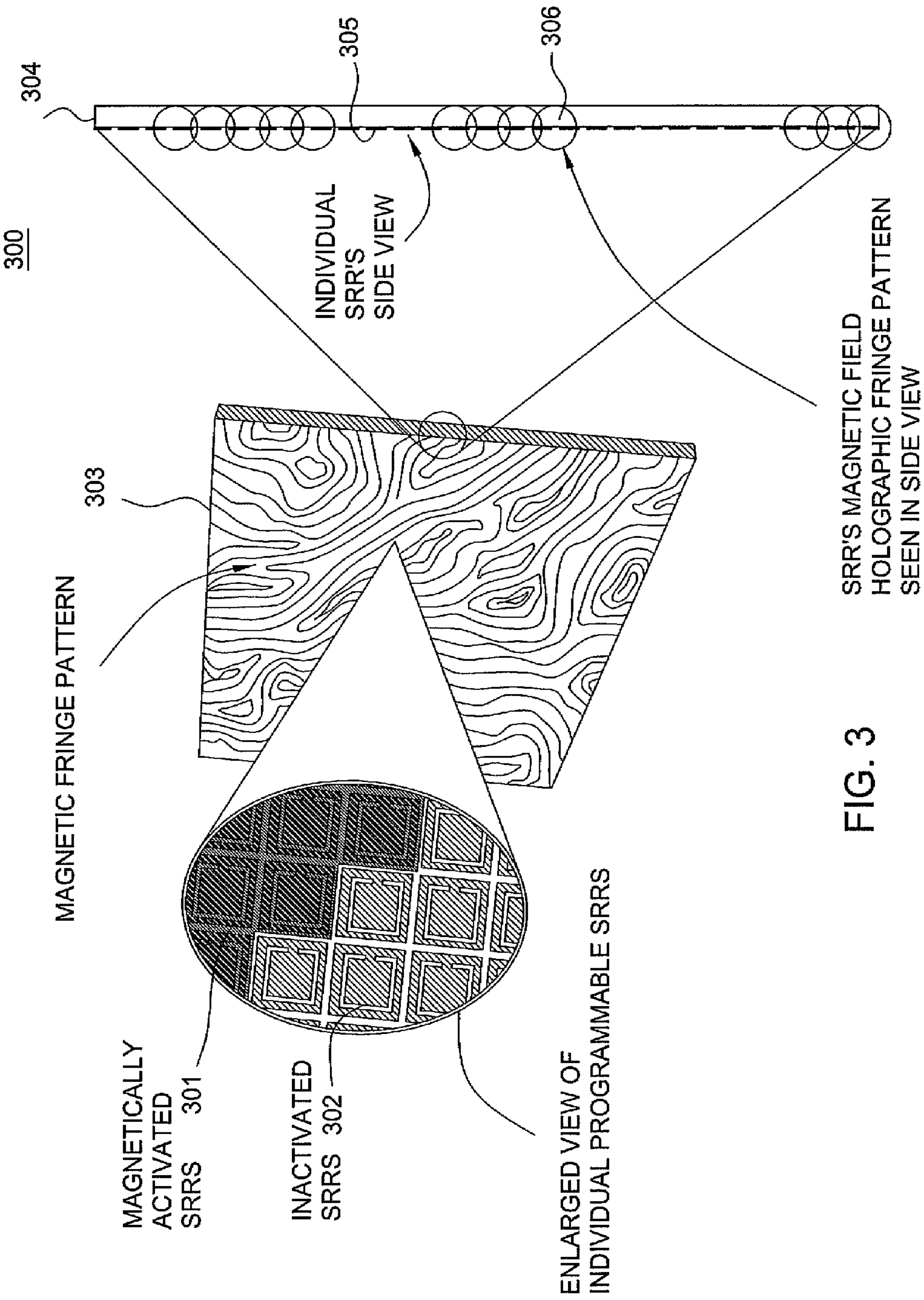
FIG. 3 illustrates a programmable layer of a 2D metamaterial film.

FIG. 3 illustrates a programmable layer 300 of a 2D metamaterial film. The programmable layer 300 of the metamaterial film comprises magnetically active SRRs 301 (shown in a darker shade) and magnetically inactive SRRs 302 (shown in a lighter shade). By selectively turning on one or more of split-ring resonators, a holographic fringe like magnetic pattern is created. The resulting magnetic fringe pattern can then be used to modify a traversing wave in the magnetic domain much like a holographic fringe pattern can affect optical wavelengths for beam shaping. In FIG. 3, a magnetic fringe pattern 303 is created using software via a processor that generates hologram like images for metamaterial SRR arrays. A side view 304 of the programmable layer illustrates a side view 305 of the individual SRRs, and a side view 306 of the magnetic fringe patterns.

In one embodiment, the current method teaches a 3D (three-dimensional) matrix of SRRs, wherein each SRR within each layer is independently addressable. Specifically, each of the SRRs in a 3D stack of layers of SRRs can be independently addressed and charged. In one embodiment, the 3D matrix of SRRs, comprises a stack of programmable 2D metamaterial layers (2D films) assembled to provide the 3D matrix of SRRs.

In one embodiment, the 3D SRR matrix is able to provide dynamic reconfiguration, wherein the effect of each SRR can be turned on and off. For example, the magnetically charged split-ring resonators have areas of higher magnetic field strength. The areas with higher magnetic field strength tend to bend a passing wave. The metamaterials 3D matrix of SRRs can be charged individually or as groups of SRRs.

Additionally the 2D arrays can be equally translated into 3D arrays (an analogue of photonic crystals), For example, three dimensional groups of SRRs can be formed to create 3D magnetic structures, within the stacked metamaterial medium. The 3D magnetic structures can then be used to uniquely shape a passing magnetic wave. In one embodiment, a dynamic software control provides sequential modification of the wave passing through the 3D SRR matrix. For example, if the 3D SRR matrix is formed from 2D layers of metamaterial films, the passing wave can be sequentially bent and phase delayed as the wave traverses the successive 2D metamaterial layers of independently addressable magnetic elements. In one embodiment, the 3D SRR matrix of the current teaching is used to create the equivalent of three dimensional phase holograms for terahertz applications in the magnetic domain.

Figure 4:
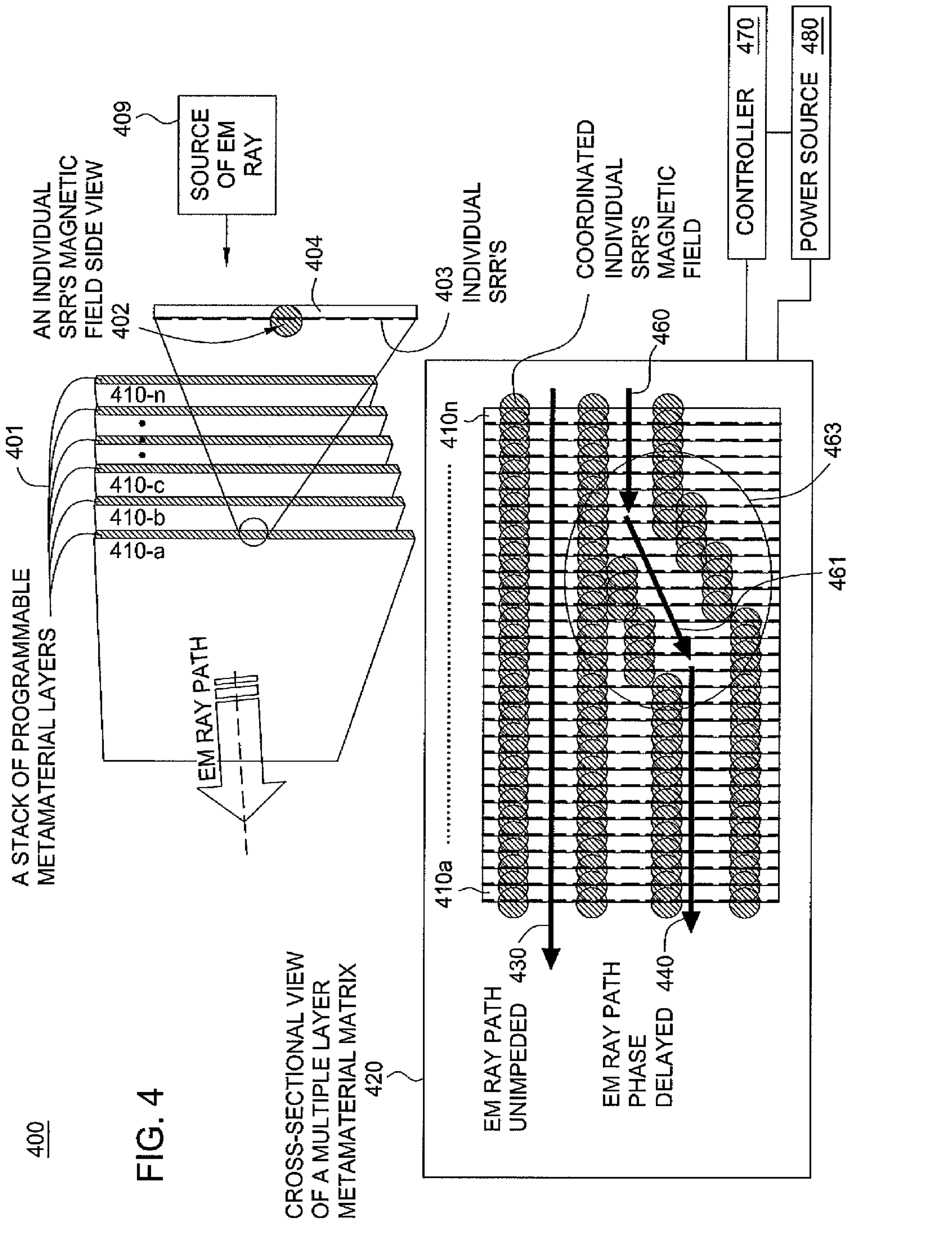
FIG. 4 illustrates a 3D (three-dimensional) matrix of SRRs.

FIG. 4 illustrates a 3D matrix of SRRs 400. The 3D matrix of SRRs 400 comprises a stack 401 of 2D metamaterial layers 410*a*-410*n*. Each of the 2D metamaterial layers 410*a*-410*n* comprises SRRs that are individually addressable. A side view 404 illustrates the metamaterial layer 410*a*. The side view 404 shows individual SRRs 403 of the metamaterial layer 410*a* and a magnetic field side view 402 of individual SRR. A source 409 of electromagnetic waves, e.g., in the THz spectrum, is illustrated broadly as providing an electromagnetic beam having a beam path that traverses through the 3D matrix of SRRs 400.

Furthermore, FIG. 4 illustrates a cross-sectional view 420 of the 3D metamaterial matrix 400. The magnetic fields of the metamaterial layers 410*a*-410*n* are controlled by a controller 470 in a coordinated manner to sequentially affect a passing wave, e.g., applying a charge to one or more SRRs via a power source 480. For example, the passing wave may be bent, e.g., phase delayed, etc. For example, the individual SRRs of the various layer 410*a*-410*n* are coordinated to create an unimpeded E/M wave 430 and/or a phase delayed E/M wave 440. Thus, the view 420 illustrates a cross-sectional view of the 3D metamaterial matrix 400 that is capable of providing beam steering. More specifically, the individual SRRs of each of the various layers 410*a*-410*n* are coordinated to shape the 3D magnetic field to steer the E/M wave 440 (the steered portion is shown as 461), wherein the E/M wave portion 461 has a direction achieved by steering the wave 460 entering the 3D structure 401 via the magnetic fields 463.

In one embodiment, a plurality of stacked layers may be designed to produce different wave front effecting properties, e.g., beam forming, frequency filtering, beam shaping, beam focusing, phase correction, delay correction, creating shutters, etc. The plurality of stacked layers can be formed along the transmission path of the metamaterials, with each stacked layer accomplishing one or more of the above wave front effecting properties. The selection and combination of any or all of these wave front effecting properties may be used to provide an adaptive capability that creates a hitherto unique level of interactive wave front control. The interactive wave front control takes advantage of the properties of metamaterials so as to dynamically optimize the transmission requirements of the wave front.

In one embodiment, the 3D matrix of SRRs is used for active wave front correction. For example, under conditions of turbulence (temperature and particulates) and varying atmospheric density, an E/M transmission, may experience phase errors—producing a spread of wave front arrival times. This phase displacement is a phenomenon well known in laser based optical wireless communications and in transmissions using higher E/M frequencies. The atmospheric phase disruption occurs less so at lower E/M frequency. But as the wireless communications industry starts to utilize higher E/M frequencies in the millimeter and sub-millimeter with higher modulation rates, atmospherically induced phase delays and Doppler effects from moving vehicles may increasingly become an issue. In one embodiment, a cluster of SRRs within the metamaterial's 3D array is used to selectively correct phase delays—smoothing out the errant wave front traversing the 3D metamaterial matrix before it reaches a receiver. In another embodiment, the present method can be used to pre-distort an outgoing wave front, such that the pre-distortion compensates for a measured atmospheric distortion that occurs after transmission.

It is important to note that the atmospheric phase distortions found in optical and infrared frequencies are greater than those that might be found in millimeter wave and terahertz frequencies. Thus, atmospherically induced phase errors in millimeter and sub-millimeter terahertz frequencies should be slower and of less phased displacement. Thus, the atmospheric phase distortions for the millimeter and terahertz frequencies are easier to correct via the 3D metamaterial.

In one embodiment, the current method can minimize a group delay and phase distortion of a traversing wave by controlling the spacing and layout of the SRRs. For example, the group delay and phase distortion considerations can be addressed by utilizing much smaller ring resonators in a much denser 3D matrix layout (small fraction of a wavelength) of split ring-resonators. In one embodiment, the clusters of SRRs can be dynamically created and shaped between and among array layers, creating a shaped super-cluster split-ring resonator magnetic field that could be dynamically shaped to efficiently compensate for localized phase and delay conditions. It is important to note that wave front detection methods may utilize individually addressable SRRs configured as passive magnetic field detectors (e.g., sensing the current output from a waves passing magnetic field).

Fringe based holograms (photographic film based interference holograms) have the property that the whole hologram fringe pattern records the entire side of an illuminated object facing the recording medium. This occurs because the diffused reflected light from each point on the illuminated surface of the object reaches each part of the recording film (unless obstructed) and interferes with an unaltered reference beam—creating the entire distributed hologram fringe pattern. In viewing mode, only a small piece of the hologram's fringe pattern is required to image the virtual object. The virtual image only differs from the full sized hologram in the brightness and slight resolution loss.

Similarly, computer generated holograms are modeled based on well defined diffuse and linear ray tracing methods that are employed to predict the fringe interference patterns that would result from a virtual object (virtual shaped object) configured under a traditional hologram illumination arrangement. The virtual object could be modeled to any shape, and could in itself have virtual properties such as optical power, focusing and refractive properties—effectively creating a virtual lens that images a virtual source or multiple sources. It is important to note that holograms of lenses can focus and magnify background objects just like a real lens.

In one embodiment, the current method teaches reproducing the useful properties of whole holograms, described above, in a metamaterial hologram. This imaging property of holograms described above implies that the whole hologram would not be needed to project an outgoing shaped beam, i.e., sub-area imaging may suffice. In fact, the hologram could send out multiple beams from different parts of the hologram. In computer generated holograms and metamaterial holograms, selectable sectors of the hologram could be used to actively and dynamically steer outgoing beams. A metamaterial phase hologram or a fringe hologram could also be used to break up a passing beam into separate multiple beams, referred to as beamlets, creating the equivalent of a selectable single beam source or multiple beam sources. The multiple beamlets would then pass on to the fringe beam steering stage for directing beams to multiple end users.

In one embodiment, the current method also teaches providing a modulation device in the above 3D metamaterial matrix to modulate a beam or beamlet prior to reaching the beam steering stage. For example, in addition to the multi-source and beam steering hologram stages, the current method may provide a spatial light modulator (SLM) array or other high speed modulation devices may be provided in the layered metamaterial matrix. The modulators are then dynamically matched and aligned to the sectored beams. Individual sectors are then modulated prior to reaching the beam steering stage.

In one embodiment, one or more of the above hologram properties can be synthesized by a 3D stack of metamaterial layers, where each layer is under electronic and software control. For example, one layer (or a set of layers) may be used to synthesize properties of whole holograms, another layer (or a set of layers) for beam steering, another layer (or a set of layers) for phase delay, or combinations thereof etc.

In one embodiment, the current method teaches using the above holographic metamaterial as a bi-directional optics that functions as both a transmitter optics and a receiver optics. Bi-directional transmission is a property of both optical lenses and radio antennas. E/M waves can propagate and be altered by an antenna in a bi-directional manner. For example, an incoming wave front is modified (collected and focused), in the same, but in the reverse order, as an outgoing (transmitted) beam. This bi-directional transmission property is also referred to as dual property. The dual property enables directing a beam (from a source) out into free space, while simultaneously collecting and focusing an incoming beam back onto a suitably located detector. Thus, the holographic metamaterial can function simultaneously as a transmitter beam shaping optics and a collector receiver optics.

In one embodiment, the hologram fringe pattern of the metamaterial can also be modeled to accept and direct multiple frequencies (colors) of millimeter wave and sub-millimeter wave THz spectrum from and to different transmitters and receivers. For example, the hologram fringe patterns can be modeled to allow different frequency bands to be both simultaneously transmitted and received in full duplex mode.

In one embodiment, the current method teaches projecting video images through a display made of a metamaterial matrix that creates holographic images by an interference fringe generation. For example, a software or electronically controlled 3D metamaterial matrix of sub-micron or nano scale SRR's compatible for 480-750 nm applications) may be designed for high resolution true 3D displays and TV screens. The 3D video images could be formed within the 3D array layers to provide a sense of depth or are then projected through the metamaterial to form more traditional holograph displays. The 3D image information can be delivered to the display device from a facility utilizing a video stereographic image reduction processing method that produces a third dimension that represents depth. The depth information can then represented within the 2D array layers to provide 3D video scene information to the viewer. The 3D scene information can be combined and further processed to build and modeled an animated computer generated virtual 3D environment.

In one embodiment, the above video derived 3D (software generated) virtual environment model may then be used as the basis to ray trace and generate the metamaterial holographic fringe pattern. This fringe pattern information can then be relayed to the controller of the holograph display metamaterial such that the controller generates the dynamic metamaterial holograph fringe pattern suitable for 3D metamaterial image projection.

In one embodiment, the current method teaches blending real and simulated fringe patterns. For example, using the above simulated object ray tracing to form a projected 3D image through a metamaterial hologram, the method teaches simulating the ray tracing paths of any computer generated 3D object model and having its resulting interference fringe pattern inserted into the display metamaterial hologram—blending both real and simulated fringe patterns.

In one embodiment, computer simulations and animations of real and unreal objects may be inserted, blended and projected along with video and live views projected by the metamaterial hologram. In addition to creating and inserting a hologram of a simulated object into the metamaterials hologram, the method may alter or cover an image of a real object, (viewed through the metamaterial hologram), by simulating (ray tracing) a computer generated object that would modify the computer generated fringe pattern of the real object. Such real time image manipulation at the hologram fringe level using both real and inserted simulated objects provides a powerful image alteration capability. For example, the image alteration capability may be used for applications such as cloaking of moving objects and rendering them invisible.

In one embodiment, the current method teaches the metamaterial 3D matrix described above may be used to function as a super adaptive lens for UV, visible and infrared, sub-millimeter and millimeter frequency spectrums. For example, a broad range of new and traditional lens properties such as focus control, image stabilization and tracking, refractive index, conic shaping, frequency selection, phase control, etc. can be simulated and controlled via an electronic or software control of the metamaterial hologram.

The above optical lens properties may be generated via both the layered magnetic fringe patterns generated by the materials multi-layered SRR arrays (which are rewritable), as well as by wave front phase control resulting from the sequential and suitably sized individual and three dimensionally clustered SRRs dispersed among the multiple layers and along the transmission axis.

In one embodiment, a nano-cell is designed to function as part of a nano-cellular cluster centered within an existing microcell. In one embodiment, the operating parameters of each nanocell may be adaptable to optimize the nanocell's behavior with respect to other members of the nano-cellular cluster. For example, the nanocells may cooperatively select available frequencies to minimize co-channel interference, while supporting dense frequency reuse and more rapid handoffs between nanocells. In one embodiment, the nano-cells can be deployed to systematically provide a super-channel footprint coverage as service demand and operator budget dictates.

In one embodiment, the wireless transport architecture provides bi-directional, high bandwidth connectivity between a portable device and a base station using one or more of: a spectrum of the Wi-Fi network, a spectrum of the cellular network and a spectrum of a nano-cell network. The cellular and Wi-Fi networks and spectrums would be used for slower real-time communication augmented by the nano-cell network for extreme throughputs. In one embodiment, the coverage area of a nano-cell is in the order of a sub-kilometer.

In one embodiment, access to a channel can be facilitated by a frequency router in a user device that detects what air interfaces are available, what user traffic is being communicated, and which air interface would be most appropriate. An example of such a router is in accordance with the IEEE 802.21 Media Independent Handover standard, which utilizes a companion "cloud-based" coordinator to orchestrate handoffs cooperatively with the device. In such a scenario, one air interface stack is used to "bootstrap" transfers of traffic to another network with its own stack. In one embodiment, the frequency routing technique may allow an air interface to be constructed, without an explicit control plane, consisting of only bearer channels which would be scheduled by a cloud-based virtual media access control layer or V-MAC.

Figure 5:
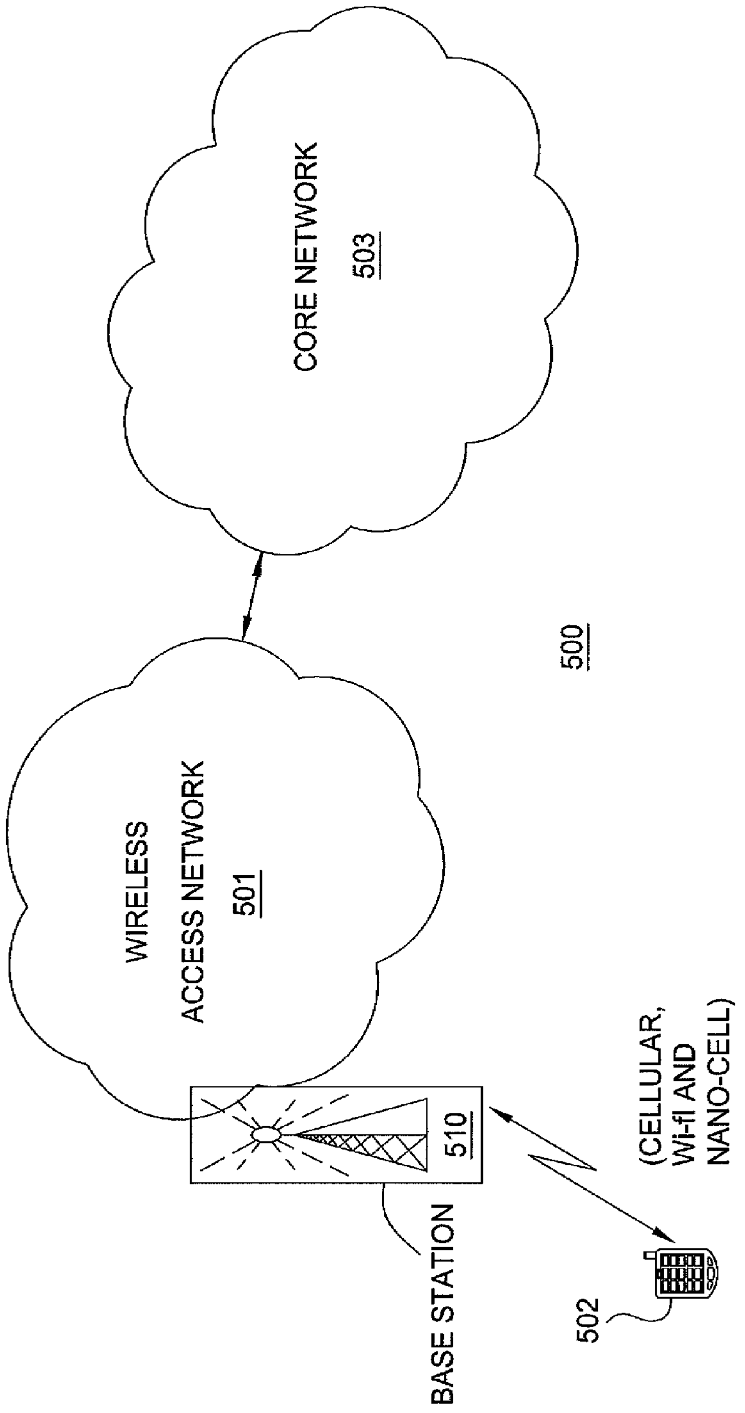
FIG. 5 illustrates an exemplary network with one embodiment of the present disclosure for providing steering a terahertz frequency electromagnetic beam.

FIG. 5 illustrates an exemplary network 500 with one embodiment of the present disclosure for providing steering of a terahertz frequency electromagnetic beam. For example, the method for steering a terahertz frequency electromagnetic beam can be implemented in a portable (mobile) endpoint device (e.g., a mobile phone of a customer) or a base station. The exemplary network 500 comprises a mobile customer endpoint device 502 (e.g., a cellular phone, a smart phone and the like) communicating with a core network 503 via a wireless access network 501. The wireless access network 501 comprises a base station 510.

In one embodiment, the service provider implements the current method for providing steering of a terahertz frequency electromagnetic beam in the mobile customer endpoint device 502 and in the base station 510. The mobile customer endpoint device 502 and base station 510 are capable of bi-directional, high bandwidth connectivity between them using one or more of: a spectrum of the Wi-Fi network, a spectrum of the cellular network and a spectrum of a nano-cell network. Furthermore, the mobile customer endpoint device 502 and base station 510 are capable of determining which of the networks (e.g., Wi-Fi, cellular, or nano-cell) is appropriate for a specific session. For example, the mobile customer endpoint device can determine the appropriate network based on the type of traffic, bandwidth requirement, etc. For example, the nano-cell network may be appropriate for extreme throughput of the THz frequency, while the cellular or Wi-Fi networks may be appropriate for slower communication.

When a THz link is established between the mobile customer endpoint device 502 and the base station 510 over a nano-cell network, the current method overcomes the complications of beam alignment by implementing metamaterials at both ends of the THz link (in the mobile device and the base station) for active beam steering, tracking and phase control at both ends of the THz link to manipulate the THz electromagnetic waves. That is, the current method teaches using metamaterials, described above, in the mobile customer endpoint device and base station as an active means of beam steering, focusing, shaping and tracking.

The metamaterials comprise independently addressable split-ring resonators. In one embodiment, the independently addressable split-ring resonators are comprised of a 3D (three-dimensional) matrix of SRRs, wherein each SRR within each layer is independently addressable. Specifically, each of the SRRs in the 3D stack can be independently addressed and charged. In one embodiment, the 3D matrix of SRRs, comprises a stack of programmable 2D metamaterial layers (2D films) assembled to provide the 3D matrix of SRRs.

In one example, the mobile customer endpoint device determines a need to perform beam alignment. For example, a signal from a base station may be detected. Based on the location of the mobile customer endpoint device, the base station and the detected signal level, an algorithm in the mobile customer endpoint device may determine a need for performing beam alignment. For example, a portion of the SRRs in the 3D stack may need to be charged to modify the beams in a manner to improve communication with the base station. Similarly, the base station may determine a need to perform beam alignment. For example, a signal from a mobile customer endpoint device may be detected, wherein the signal level indicates a need for performing beam alignment to improve the signal strength. In another example, the locations (e.g., via global positioning system (GPS) information or the like) of the base station and the mobile customer endpoint device may be used to determine a need for beam alignment. Broadly, based on the location information of a device that the terahertz frequency electromagnetic beam is being forwarded to or received from, beam alignment may be necessary. To maintain uninterrupted link coverage one or more cooperative clusters of metamaterial transceivers may be employed within an area to avoid the potential for shadowing of a single link connection via an intermediate obstructing object. The cooperative clusters would be linked together via a suitable backhaul means and spatially dispersed to maximize line of sight connectivity via any one or group of transceivers to the mobile receiver.

Figure 6:
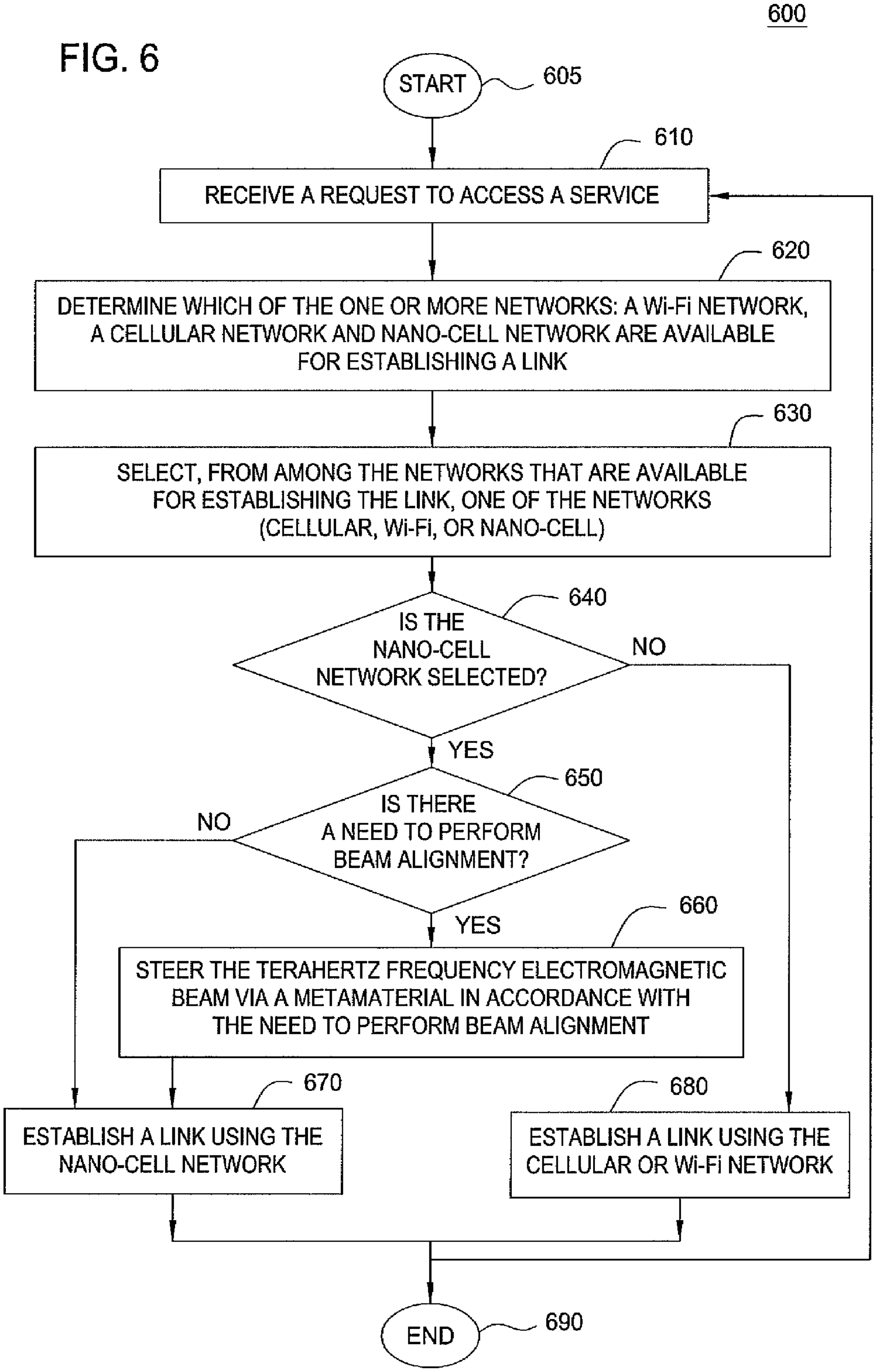
FIG. 6 illustrates a flowchart of a method for providing steering of a terahertz frequency electromagnetic beam.

FIG. 6 illustrates a flowchart of a method 600 for providing steering of a terahertz frequency electromagnetic beam. In one embodiment, one or more steps of method 600 can be implemented in a mobile customer endpoint device, e.g., a mobile phone, or a base station. Method 600 starts in step 605 and proceeds to step 610.

In step 610, method 600 receives a request to access a service, e.g., a wireless service. For example, a mobile customer endpoint device may receive a request from the user of the phone to initiate a call (broadly a communication session). In another example, a base station may receive a request destined towards the mobile customer endpoint device.

In step 620, method 600 optionally determines which of the one or more networks: a Wi-Fi network, a cellular network and nano-cell network are available for establishing a link, this may be done at a network control layer and will decide which layer, if available locally, that is used for transmission based on the type of service (voice, video, media and data) and the bandwidth required to meet this service demand. For example, the mobile customer endpoint device may be at a location where there is no cellular network coverage. In another example, all three networks may be available.

In step 630, method 600 optionally selects, from among the networks that are available for establishing the link, one of the networks (e.g., Wi-Fi, cellular, or nano-cell). For example, the mobile customer endpoint device in the above example may determine the appropriate network for the request based on the type of traffic, bandwidth requirement, etc. For example, the nano-cell network layer which uses THZ frequency may be appropriate for extreme throughput and hence may be selected by the control layer for requests that need extreme throughput. It should be noted that steps 620, 630 and 680 (discussed below) can be deemed to be optional steps. For example, in one embodiment, the ability to select the Wi-Fi network and cellular network is considered to be optional, whereas selecting the nano-cell network is the default access method as further discussed below.

In step 640, method 600 determines if the nano-cell network is selected. If the nano-cell network is selected, the method proceeds to step 650. Otherwise, the method proceeds to step 680.

In step 650, method 600 determines if there is a need to perform beam alignment. In one example, the signal strength level, locations of the mobile customer endpoint device and/or base station may indicate whether beam alignment will be required. To illustrate, if the signal strength level is deemed to be too low, then the method may deem that beam alignment is necessary. In another example, the physical locations of the mobile customer endpoint device and/or base station, e.g., based on GPS location information, may deem that beam alignment is necessary. If there is no need for beam alignment (e.g., there is good signal strength, no Doppler effects or the orientation is proper), the method proceeds to step 670. Otherwise, the method proceeds to step 660.

In step 660, method 600 steers the terahertz frequency electromagnetic beam via a metamaterial in accordance with the need to perform beam alignment. For example, the method may identify and charge one or more SRRs in a 3D stack of metamaterial in accordance with the need to perform beam alignment. For the above example, a portion of the SRRs in the mobile customer endpoint device may need to be charged to modify the beams to and from the base station. The method then proceeds to step 670.

In step 670, method 600 establishes a link between the mobile customer endpoint device and the base station using the nano-cell network. For example, the method communicates with the base station over a frequency in the THz spectrum. The method then proceeds to step 690 to end processing the current request or alternatively returns to step 610 to receive more requests.

In step 680, method 600 optionally establishes a link between the mobile customer endpoint device and the base station using the cellular network or Wi-Fi network. For example, the normal procedure of established a link via a cellular network or a Wi-Fi network may be performed. The method then proceeds to step 690 to end processing the current request or alternatively to step 610 to receive more requests.

It should be noted that although not specifically specified, one or more steps of methods 600 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 6 that recite a determining operation or involve a decision, do not necessarily require that both branches of the determining operation be practiced. In other words, one of the branches of the determining operation can be deemed as an optional step.

Figure 7:
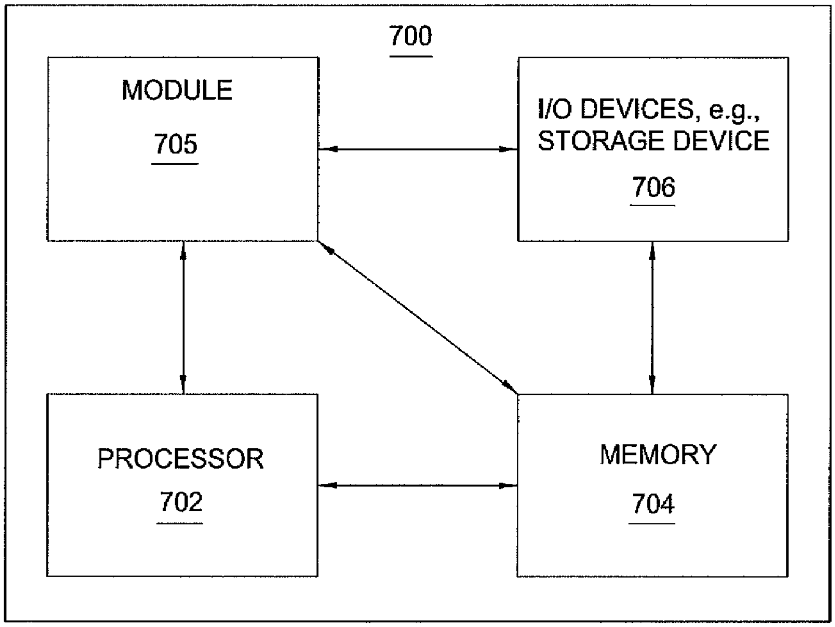
FIG. 7 illustrates a high-level block diagram of a general-purpose computer suitable for use in performing the functions described herein.

FIG. 7 depicts a high-level block diagram of a general-purpose computer suitable for use in performing the functions described herein. As depicted in FIG. 7, the system 700 comprises a processor element 702 (e.g., a CPU), a memory 704, e.g., random access memory (RAM) and/or read only memory (ROM), a module 705 for providing steering a terahertz frequency electromagnetic beam, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the method and apparatus of the current disclosure can be implemented in a combination of software and hardware, e.g., using application specific integrated circuits (ASIC), a general-purpose computer or any other hardware equivalents. In one embodiment, the present module or process 705 for providing alignment of a terahertz frequency electromagnetic beam can be loaded into memory 704 and executed by processor 702 to implement the functions as discussed above. As such, the present method 705 for providing alignment of a terahertz frequency electromagnetic beam (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a terahertz frequency electromagnetic beam, comprising:

receiving the terahertz frequency electromagnetic beam via a plurality of stacked layers, wherein each one of the plurality of stacked layers comprises a plurality of metamaterial layers stacked in a three dimensional matrix, wherein each one of the plurality of stacked layers produces a different wave front effecting property, each one of the plurality of metamaterial layers having a plurality of addressable magnetic elements arranged in a matrix comprising a plurality of rows and a plurality of columns, where a resonant frequency of each of the plurality of addressable magnetic elements is capable of being programmably changed to form a metamaterial hologram;

activating, by a processor, a subset of the plurality of addressable magnetic elements to form the metamaterial hologram in each one of the plurality of metamaterial layers in a first stacked layer of the plurality of stacked layers;

and manipulating, by the processor, the terahertz frequency electromagnetic beam with the metamaterial hologram of each one of the plurality of metamaterial layers through the first stacked layer of the plurality of stacked layers, wherein the manipulating comprises performing pre-distortion of an outgoing wave front to compensate for a measured atmospheric distortion that occurs after transmission.

2. The method of claim 1, further comprising manipulating in a second stacked layer of the plurality of stacked layers to cause a change in a path of the terahertz frequency electromagnetic beam.

3. The method of claim 1, further comprising manipulating in a second stacked layer of the plurality of stacked layers to cause a change in a shape of the terahertz frequency electromagnetic beam.

4. The method of claim 1, further comprising manipulating in a second stacked layer of the plurality of stacked layers to cause a change in a focus of the terahertz frequency electromagnetic beam.

5. The method of claim 1, further comprising manipulating in a second stacked layer of the plurality of stacked layers to cause a change in a timing of the terahertz frequency electromagnetic beam.

6. The method of claim 1, further comprising manipulating in a second stacked layer of the plurality of stacked layers to cause a change in a frequency of the terahertz frequency electromagnetic beam.

7. The method of claim 1, wherein the plurality of addressable magnetic elements comprises a plurality of addressable split-ring resonators.

8. The method of claim 7, wherein each of the plurality of addressable split-ring resonators is independently addressable.

9. The method of claim 8, wherein each addressable split-ring resonator comprises a varactor device.

10. The method of claim 9, wherein each varactor device exhibits a capacitance proportional to a programmably-applied voltage.

11. The method of claim 10, wherein each programmably-applied voltage of each varactor is stored by a capacitor connected to a field effect transistor.

12. The method of claim 11, wherein each varactor's bias is applied through two resistors connected to the capacitor for isolating a DC bias.

13. The method of claim 1, wherein the processor is in a base station.

14. The method of claim 1, wherein the processor is in a mobile endpoint device.

15. The method of claim 1, further comprising:

establishing a communication link using the terahertz frequency electromagnetic beam.

16. The method of claim 1, wherein the manipulating is based on a signal strength of the terahertz frequency electromagnetic beam.

17. An apparatus for manipulating a terahertz frequency electromagnetic beam, comprising:

a three-dimensional matrix comprising a plurality of stacked layers, wherein each one of the plurality of stacked layers comprises a stack of programmable two-dimensional metamaterial layers of a plurality of addressable magnetic elements arranged in a matrix comprising a plurality of rows and a plurality of columns, where a resonant frequency of each of the plurality of addressable magnetic elements is capable of being programmably changed to form a metamaterial hologram, wherein each one of the plurality of stacked layers produce a different wave front effecting property; and a controller coupled to the three-dimensional matrix, wherein the controller activates a subset of the plurality of addressable magnetic elements of each one of the programmable two-dimensional metamaterial layers of a first stacked layer of the plurality of stacked layers to form the metamaterial hologram on each one of the programmable two-dimensional metamaterial layers that manipulates the terahertz frequency electromagnetic beam, wherein the manipulating comprises performing pre-distortion of an outgoing wave front to compensate for a measured atmospheric distortion that occurs after transmission.

* * * * *